(12) United States Patent
Matsui

(10) Patent No.: US 8,537,287 B2
(45) Date of Patent: Sep. 17, 2013

(54) PROJECTION TELEVISION AND FIXING METHOD OF SCREEN UNIT OF PROJECTION TELEVISION

(75) Inventor: Tomomi Matsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 256 days.

(21) Appl. No.: 13/017,762

(22) Filed: Jan. 31, 2011

(65) Prior Publication Data

US 2011/0187944 A1    Aug. 4, 2011

(30) Foreign Application Priority Data

Feb. 1, 2010    (JP) .................................. 2010-020690

(51) Int. Cl.
*H04N 5/64* (2006.01)

(52) U.S. Cl.
USPC .......................................... 348/789; 348/744

(58) Field of Classification Search
USPC ................. 348/744–775, 787, 794, 836–843, 348/781, 789; 353/98; 359/456, 457
IPC ...................................... H04N 5/64, 9/31, 5/74
See application file for complete search history.

(56) References Cited

U.S. PATENT DOCUMENTS

| | | | |
|---|---|---|---|
| 7,148,934 B2 * | 12/2006 | Yuan et al. | 348/789 |
| 7,175,282 B2 * | 2/2007 | Jung et al. | 353/47 |
| 2003/0011250 A1 * | 1/2003 | Pullmann et al. | 307/326 |
| 2007/0273794 A1 * | 11/2007 | Sprague et al. | 348/744 |
| 2009/0090187 A1 * | 4/2009 | Sano | 73/655 |
| 2009/0115972 A1 * | 5/2009 | Aizawa et al. | 353/74 |

FOREIGN PATENT DOCUMENTS

| | | | |
|---|---|---|---|
| JP | 2001-154274 A | | 6/2001 |
| JP | 2002-244209 A | | 8/2002 |
| JP | 2004-148724 A | | 5/2004 |

* cited by examiner

*Primary Examiner* — Sherrie Hsia
(74) *Attorney, Agent, or Firm* — Birch, Stewart, Kolasch & Birch, LLP.

(57) ABSTRACT

Screws that fasten a screen unit to a body are inserted from the front side of the body, a front cover that covers and conceals the screws is provided on a front surface of a frame, this front cover is fastened to the body by screws inserted into the body from its rear side, a rear cover that covers and conceals the screws is provided on a rear surface of the body, a front safety switch that detects opening of the front cover and a rear safety switch that detects opening of the rear cover are provided, and emission of a laser light beam of an optical engine is stopped when a detection signal of at least one of the front safety switch and the rear safety switch is output.

9 Claims, 3 Drawing Sheets

PROJECTION TELEVISION AND FIXING METHOD OF SCREEN UNIT OF PROJECTION TELEVISION

BACKGROUND OF THE INVENTION

1. Field of the Invention

The present invention relates to a rear transmissive projection television that uses a high output light source, particularly, a semiconductor laser as a light source and a fixing method of a screen unit thereof.

2. Description of the Related Art

In a rear transmissive projection television, an optical engine that projects an image by a light source such as a high-pressure mercury lamp and an LED lamp is included and an enlarged image is projected on a screen provided on the front side of its body. A light beam is shielded to prevent the light beam from leaking to the outside until the image projected from the optical engine is focused on the screen (see Japanese Patent Application Laid-open No. 2001-154274).

In a projection television that utilizes a mercury lamp or an LED as a light source, a screen unit in which a screen on a front side and a frame body are unified is fixed to the body with screws or the like. This screen unit is removed from the body at the time of replacement of the screen or when cleaning inside of the body (see Japanese Patent Application Laid-open No. 2002-244209).

Moreover, as a projection television equipped with a semiconductor laser as a light source, there is proposed a product that is configured such that a projection is provided on a rear cover and opening of the rear cover is detected by contact and non-contact of this projection and emission of the semiconductor laser as the light source is hampered (see Japanese Patent Application Laid-open No. 2004-148724).

However, according to the above conventional technologies, in the rear transmissive projection television that uses a semiconductor laser for red, blue, and green as a light source, when the light source is erroneously emitted in a state where the screen unit is removed for replacing a damaged screen or cleaning the inside, an intense laser beam from the optical engine may directly enter an eye of an operator, so that improvement has been required.

Moreover, in the case of providing a safety switch for avoiding emission of a laser beam of the optical engine when removing the screen unit between the screen unit and the body, many safety switches for detecting opening of a gap between the screen unit and the body need to be provided.

The present invention is achieved in view of the above and has an object of providing a projection television capable of securely preventing an intense laser beam emitted from an optical engine from accidentally entering an eye of an operator with a simple configuration and further capable of improving a design, and a fixing method of a screen unit of the projection television.

SUMMARY OF THE INVENTION

It is an object of the present invention to at least partially solve the problems in the conventional technology.

In order to solve the aforementioned problems, the projection television according to one aspect of the present invention is constructed in such a manner as to include: a substantially box-shaped body; an optical engine that is arranged in the body and projects an image with a semiconductor laser as a light source; and a screen unit that causes the image projected from the optical engine to enter from its rear surface and displays the image on its front surface, wherein the screen unit is fastened to the body by a first fixing screw inserted into a frame of the screen unit from its front side, a front cover that covers and conceals the first fixing screw is provided on a front surface of the frame, the front cover is fastened to the body by a second fixing screw inserted into the body from its rear side, a rear cover that covers and conceals the second fixing screw is provided on a rear surface of the body, and wherein the projection television further includes: a front safety switch that detects opening of the front cover, a rear safety switch that detects opening of the rear cover, and a detecting circuit that stops emission of a laser light beam of the optical engine when a detection signal of at least one of the front safety switch and the rear safety switch is output.

Further, the fixing method of a screen unit of a prejection television that includes a substantially box-shaped body, an optical engine that is arranged in the body and projects an image with a semiconductor laser as a light source, and a screen unit that causes the image projected from the optical engine to enter from its rear surface and displays the image on its front surface according to another aspect of the present invention is constructed in such a manner as to include: using a fixing screw that fastens the screen unit to the body as a first fixing screw inserted into a frame of the screen unit from its front side; providing a front cover that covers and conceals the first fixing screw on a front surface of the frame; fastening the front cover to the body by a second fixing screw inserted into the body from its rear side; providing a rear cover that covers and conceals the second fixing screw on a rear surface of the body; providing a front safety switch that detects opening of the front cover and a rear safety switch that detects opening of the rear cover; and stopping emission of a laser light beam of the optical engine when a detection signal of at least one of the front safety switch and the rear safety switch is output.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiment.

Figure 1:
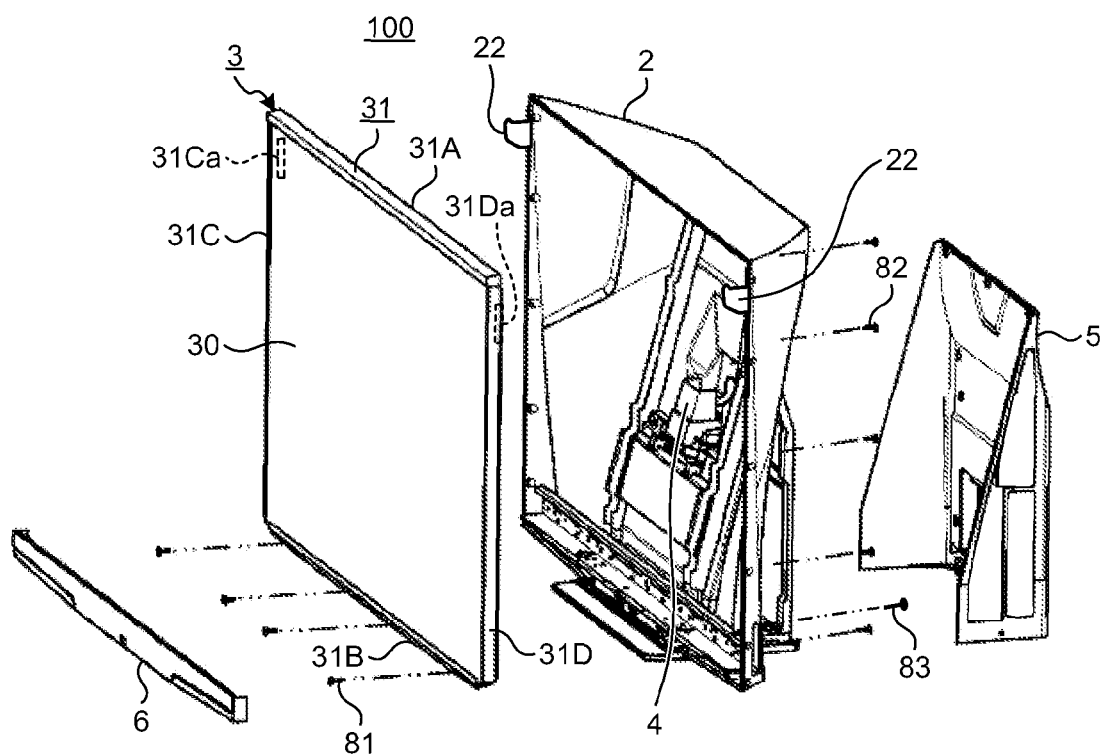
FIG. 1 is an exploded perspective view illustrating an appearance of a rear projection television in a present embodiment observed from its front side.
Figure 2:
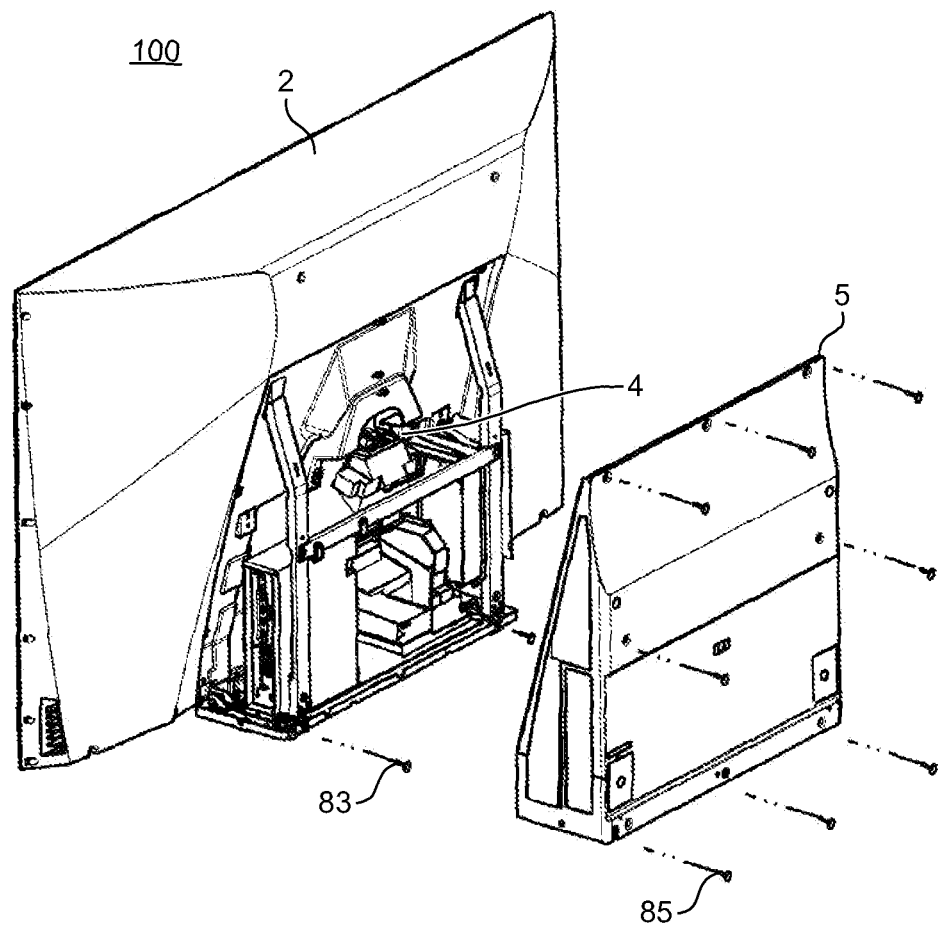
FIG. 2 is an exploded perspective view illustrating an appearance of the rear projection television in the present embodiment observed from its rear side.

The embodiment of the present invention will be explained below in detail with reference to the drawings. FIG. 1 is an exploded perspective view illustrating an appearance of a rear projection television in the present embodiment from the front side, and FIG. 2 is an exploded perspective view illustrating an appearance from the rear side. A rear projection television 100 in the present embodiment includes an approximately box-shaped body 2, an optical engine 4 that is provided in the body 2 and projects an image with a semiconductor laser as a light source, a transmissive screen unit 3 that is provided to close the front opening of the body 2 and displays the image projected on the rear surface on the display screen on the front surface, a front cover 6 that is provided to cover the lower portion of the screen unit 3, and a rear cover 5 that is provided to cover the rear side of the device.

The screen unit 3 is configured to include a screen 30 formed by a rectangular laminate of a lenticular lens sheet and a Fresnel lens sheet superimposed on a thin plate glass in such a manner as to sandwich the thin plate glass, and a frame body 31 that surrounds the outer peripheral edge portion of this screen 30 over the entire periphery. The frame body 31 is configured to include an upper portion frame 31A, a lower portion frame 31B, a side portion frame 31C, and a side portion frame 31D such that each one has a C-shaped cross section and cover a corresponding one of four side edge portions of the screen 30.

In the screen unit 3, the lower portion frame 31B is fastened to the body 2 with screws (first fixing screws) 81 from the device front side, and the two side portion frames 31C and 31D are fastened to the body 2 with screws 82 from the rear side.

The front cover 6 is attached to the body 2 from its front side to conceal the screws 81 that fasten the screen unit 3 and is fastened with screws (second fixing screws) 83 from the rear side of the body 2, and the screws 83 are covered by the rear cover 5 attached from the body rear side. The rear cover 5 is fastened to the body 2 with screws 85 from the rear side.

Figure 3:
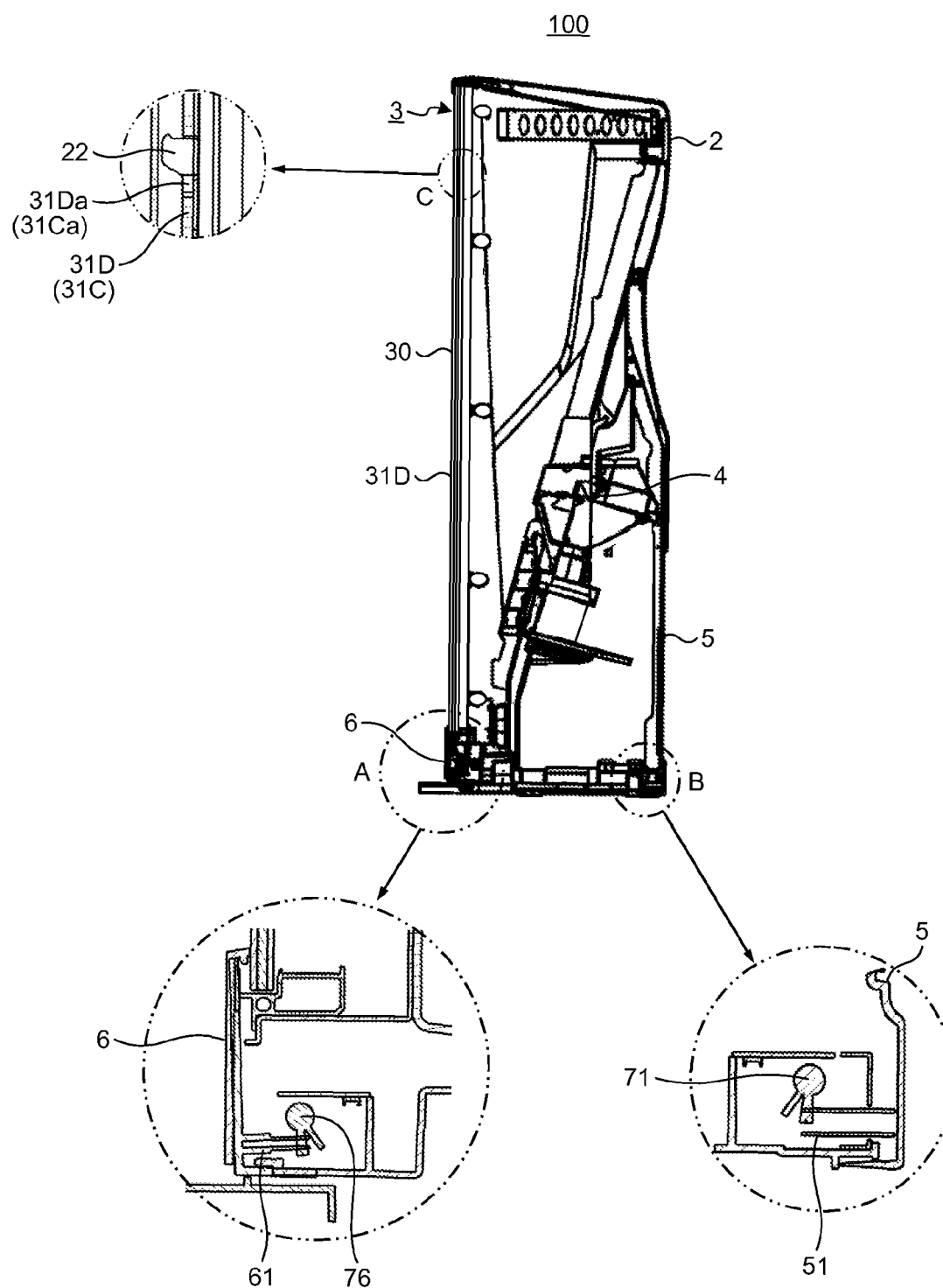
FIG. 3 is a vertical cross-sectional view of the rear projection television observed from its side.

FIG. 3 is a vertical cross-sectional view of the rear projection television 100 in a side view, which includes an enlarged view of a C portion illustrating details of a side portion hook 22 provided on the side surface of the body 2, a detailed enlarged view of a front safety switch 76 near the front cover 6 of an A portion on the body front side, and a detailed enlarged view of a rear safety switch 71 near the rear cover 5 of a B portion on the body rear side. In addition to the fixing structure of the screen unit 3 by the screws 81 and 82, slits 31Ca and 31Da (engaged portions) formed in the upper portions of the two side portion frames 31C and 31D, respectively, and the side portion hooks 22 and 22 (engaging portions) that protrudes forward from the right and left of the front opening edge portions of the body 2 and are engaged with the slits 31Ca and 31Da are provided (see C enlarged portion in FIG. 3). The side portion hooks 22 and 22 are engaged with the slits 31Ca and 31Da to temporarily support the screen unit 3 from the body 2, thereby preventing the screen unit 3 from being removed from the body 2 even when the screws 81 and 82 come off.

On the front side of the body 2, the front safety switch 76 is fixed just under the lower portion frame 31B of the screen unit 3, and the lever of the front safety switch 76 is pressed by a projection 61 provided on the front cover 6, and when the front cover 6 is removed, the lever of the front safety switch 76 returns and a detecting circuit operates.

The rear safety switch 71 is fixed to the lower portion on the rear side of the body 2, and the lever of the rear safety switch 71 is pressed by a projection 51 provided on the rear cover 5, and when the rear cover 5 is removed, the lever of the rear safety switch 71 returns and a detecting circuit operates. When any one of the detecting circuits of the front safety switch 76 and the rear safety switch 71 operates, emission of a laser beam of the optical engine 4 is stopped.

According to the rear projection television 100 having the above configuration, in the case of performing an operation of removing the screen unit 3, for example, because the screen unit 3 is damaged or dust is adhered, when all of the screws 82 fastening the body 2 and the screen unit 3 from the rear side are removed in a state where the power is kept on, the side portion hooks 22 and 22 provided on the side surface of the body 2 and the slits 31Ca and 31Da are engaged with each other and are not disengaged by an erroneous attempt to open the upper portion of the screen unit 3 with respect to the body 2, so that intense light such as a semiconductor laser beam does not leak from a gap between the body 2 and the screen unit 3.

Moreover, in order to remove the screws 81 that fasten the lower portion frame 31B of the screen unit 3, first, the screws 85 are removed and the rear cover 5 is removed, and next, the screws 83 are removed and the front cover 6 is removed, thereby reaching a state in which the screws 81 that fasten the lower portion frame 31B can be removed. In addition thereto, the optical engine 4 is stopped by the two detecting circuits of the rear safety switch 71 and the front safety switch 76, which is equivalent to a state where a double safety measure is provided for the case where the power is forgotten to be turned off or the power is erroneously turned on in a state of no screen unit 3, so that it is possible to securely prevent that an image by a semiconductor laser directly enters an eye of an operator from the optical engine 4. Moreover, the screws 81 and 82 that fasten the screen unit 3 are concealed by the front cover 6 and the rear cover 5, so that a design is improved.

If at least part (for example, the screws 81 that fasten the lower portion frame 31B) of the screws is inserted from the device front side among the screws that fasten the screen unit 3 to the body 2 as in the present embodiment, it is possible to obtain the similar effect to the case of inserting all of the screws that fasten the screen unit 3 to the body 2 from the device front side, and moreover, only the screws 81 that fasten the lower portion frame 31B are inserted from the device front side and the screws 81 are covered and concealed by the front cover 6, so that the front cover can be made small and a design is improved.

The engaging portions and the engaged portions that prevent the screen unit 3 from being removed are not limited to those in the present embodiment, and it is applicable that a hook is provided on the two side portion frames 31C and 31D and a slit is provided in the body 2. Moreover, they can have other shapes and a predetermined effect can be obtained so long as they can temporarily support the screen unit 3 from the body 2 in a state where the screws 81 and 82 are removed.

As explained heretofore, according to this invention, a double safety measure is provided for the case of erroneous handling such as opening of a cover in a state where the power is forgotten to be turned off or erroneous turn-on of the power in a state of no screen unit, so that it is possible to securely prevent such an accident that an image by a semiconductor laser directly enters an eye of an operator from an optical engine. Moreover, a first fixing screw that fastens the screen unit is concealed by a front cover and a second fixing screw that fastens the front cover is concealed by a rear cover, so that its design is improved as a whole.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A projection television comprising:
    a substantially box-shaped body;
    an optical engine that is arranged in the body and projects an image with a semiconductor laser as a light source; and
    a screen unit that causes the image projected from the optical engine to enter from its rear surface and displays the image on its front surface, wherein the screen unit is fastened to the body by a first fixing screw inserted into a frame of the screen unit from its front side, a front cover that covers and conceals the first fixing screw is provided on a front surface of the frame, the front cover is fastened to the body by a second fixing screw inserted into the body from its rear side, a rear cover that covers and conceals the second fixing screw is provided on a rear surface of the body, and wherein the projection television further includes a front safety switch that detects opening of the front cover, a rear safety switch that detects opening of the rear cover, and a detecting circuit that stops emission of a laser light beam of the optical engine when a detection signal of at least one of the front safety switch and the rear safety switch is output.

2. The projection television according to claim 1, wherein an engaging portion is provided to the body, an engaged portion is provided to the screen unit, and the engaging portion is engaged with the engaged portion and temporarily supports the screen unit from the body.

3. The projection television according to claim 2, wherein the engaged portion is a slit formed in a side portion frame of the screen unit, and the engaging portion is a side portion hook that projects forward from a front opening edge portion of the body and penetrates through the slit.

4. The projection television according to claim 1, wherein the first fixing screw is inserted into a lower portion frame of the screen unit from its front side.

5. The projection television according to claim 1, wherein the first fixing screw is inserted through a front surface of the frame of the screen unit into a front opening edge portion of the body.

6. The projection television according to claim 1, wherein the second fixing screw is inserted through the body from its rear side into a rear surface of the front cover.

7. A fixing method of a screen unit of a projection television that includes a substantially box-shaped body, an optical engine that is arranged in the body and projects an image with a semiconductor laser as a light source, and a screen unit that causes the image projected from the optical engine to enter from its rear surface and displays the image on its front surface, the method comprising:

using a fixing screw that fastens the screen unit to the body as a first fixing screw inserted into a frame of the screen unit from its front side;

providing a front cover that covers and conceals the first fixing screw on a front surface of the frame;

fastening the front cover to the body by a second fixing screw inserted into the body from its rear side;

providing a rear cover that covers and conceals the second fixing screw on a rear surface of the body;

providing a front safety switch that detects opening of the front cover and a rear safety switch that detects opening of the rear cover; and stopping emission of a laser light beam of the optical engine when a detection signal of at least one of the front safety switch and the rear safety switch is output.

8. The fixing method of a screen unit of a projection television according to claim 7, further comprising:

using part of all screws that fasten the screen unit to the body as the first fixing screw inserted into the frame of the screen unit from its front side; and inserting a remaining screw from the rear side of the body.

9. The fixing method of a screen unit of a projection television according to claim 8, further comprising inserting the first fixing screw into a lower portion frame of the screen unit from its front side.

* * * * *